United States Patent Office 3,553,284
Patented Jan. 5, 1971

3,553,284
COATING COMPOSITIONS COMPRISING A MIXTURE OF AN AMINOPLAST AND A POLYESTER FROM HEXAHYDROTEREPHTHALIC ACID
Franz Riemhofer, Walter Dittmann, and Ernst Christian Schütze, Marl, Germany, assignors to Chemische Werke Huels, A.G., Marl, Germany
No Drawing. Filed Nov. 6, 1968, Ser. No. 773,950
Claims priority, application Germany, Nov. 9, 1967, C 43,789
Int. Cl. C08g 37/38; C07c 69/34
U.S. Cl. 260—850    13 Claims

ABSTRACT OF THE DISCLOSURE

Exceptionally hard, highly elastic and chemically resistant coatings are obtained from compositions of:
(a) aminoplast and
(b) polyester of hexahydroterephthalic acid on a diol having adjacent hydroxy groups, e.g. ethylene glycol, butanediol-(2,3) or cyclohexenediol-(1,2).

BACKGROUND OF THE INVENTION

This invention relates to coating compositions comprising (a) a polyester containing hydroxyl and carboxyl groups and (b) polymers and/or oligomers containing N-methylol and/or N-methylol-ether groups.

Many different types of coating compositions containing aminoplasts and polyesters are well known in the prior art. For example, it is known from German Pat. 1,015,-165 that coatings can be produced by curing a mixture of a phthalic acid, fumaric acid-propylene glycol polyester with a butylated melamine-formaldehyde resin. The thus-obtained coatings, however, exhibit a poor chemical resistance.

Conversely, it is also known from German Pat. 1,015,-165 that coatings having an excellent chemical resistance can be obtained by combining an alkylated melamine-formaldehyde or urea-formaldehyde condensation product with a linear polyester, the latter being produced by polyesterification of a dicarboxylic acid with a diol of the formula:

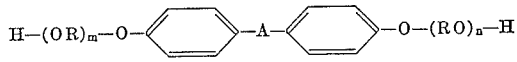

wherein

A is a 2-alkylidene radical of 3–4 carbon atoms;
R is an alkylene radical of 2–3 carbon atoms;
each of $m$ and $n$ is at least 1; and the sum of $m$ and $n$ is no higher than 3.

The coatings produced in the above manner, though hard and chemically resistant, are very brittle.

Furthermore, from U.S. Pat. 2,460,186, it is known that polyesters of 2-ethyl-hexanediol-1,3 can be used as plasticizers for urea-formaldehyde or melamine-formaldehyde condensation products. Although the resultant coatings are some what elastic, they are excessively soft.

Still further comparative experiments conducted by the inventors wherein mixtures of other linear polyesters and a melamine-formaldehyde resin were cured, resulted in elastic coatings, but like the coatings based on 2-ethyl-hexanediol-1,3, also excessively soft.

Thus, coatings having high elasticity, a high degree of hardness and satisfactory resistance to chemicals have not been evident heretofore.

SUMMARY OF THE INVENTION

An object of this invention, therefore, is to provide novel coatings wherein high elasticity is combined with a high degree of hardness.

Another object is to provide novel coating compositions and ingredients for same.

Upon further study of the specification and claims, other objects and advantages of the present invention will become apparent.

To attain the objects of this invention, there is provided a composition comprising:
(a) 40–10% by weight of at least one polymer and/or oligomer containing N-methylol and/or N-methylolether-groups; and
(b) 60–90% by weight of linear polyesters having an average molecular weight of generally 300–2500 and containing hydroxyl and carboxyl groups wherein:

(I) the alcohol component comprises:

80–100 molar percent of a diol with adjacent hydroxyl groups; and
20–0 molar percent of one or several aliphatic or cycloaliphatic diols wherein the hydroxyl functions are separated by 3–8 carbons atoms, and wherein optionally up to two of the carbon atoms can be substituted by oxygen, said oxygen atoms must be separated by at least 2 carbon atoms; and (II) the acid component comprises:

80–100 molar percent of hexahydroterephthalic acid; and
20–0 molar percent of other cycloaliphatic, aromatic and/or unsaturated or saturated aliphatic dicarboxylic acids, wherein the saturated aliphatic dicarboxylic acids do not have more than 8 carbon atoms.

DETAILED DISCUSSION OF THE INVENTION

By "adjacent" it is intended to mean that the hydroxy groups are attached to different carbon atoms which are directly connected to one another.

Examples of diols having adjacent hydroxyl groups include, but are not limited to, ethylene glycol, propanediol-(1,2), butanediol-(1,2), butanediol-(2,3) or cyclohexanediol-(1,2); in this connection, optically active diols can also be employed in the form of the racemates thereof, and cycloaliphatic diols can be utilized in their cis- or trans-form, or as a mixture of both forms. In general, the number of carbon atoms in the diol comprises 2–8, preferably 2–4 for aliphatic diols and preferably about 5 to 6 for cycloaliphatic diols. For the purposes of this invention, hydroxyl groups attached to carbon atoms of an aromatic ring are not considered to be "ols"; consequently 1,2-dihydroxybenzene is for example, not a "diol."

In addition to the diols having adjacent hydroxyl groups, it is possible to also employ 0–20 molar percent of other non-adjacent diols having their hydroxyl functions separated by 3–8 carbon atoms and wherein optionally up to two of the carbon atoms can be substituted by oxygen, said oxygen atoms must be separated by at least 2 carbon atoms, for example: propanediol-(1,3), butanediol-(1,3), butanediol-(1,4), hexanediol-(1,6), 2,2-dimethyl-propanediol-(1,3) or 1,4-bis-(hydroxymethyl)-cyclohexane, and ethers having two hydroxy groups, e.g. dipropylene glycol, diethylene glycol or triethylene glycol. In general, these diols contain 2 to 18, preferably 2 to 12 carbon atoms.

In the linear polyesters, the hexahydroterephthalic acid (cyclohexane-1,4-dicarboxylic acid) which comprises 80–100 molar percent of the acid portion can be present in the cis- or trans-form thereof, or as a mixture of both forms.

Of the other 0–20 molar percent, aromatic dicarboxylic acids can be used which include, but are not limited to, phthalic or isophthalic acid. Alternatively, other cycloaliphatic dicarboxylic acids can be employed, e.g. hexahydrophthalic acid, tetrahydrophthalic acid or hexahydroisophthalic acid, which compounds can be in their cis- or trans-form, or as mixtures thereof. In general, the ring-type dicarboxylic acid contains 6 to 12 carbon atoms, preferably 7 or 8 carbon atoms.

Saturated aliphatic dicarboxylic acids can also be used, especially those containing up to 8 carbon atoms. Examples thereof include, but are not limited to, succinic acid, glutaric acid, adipic acid or suberic acid. Although the use of saturated aliphatic dicarboxylic acids is preferred, it is also possible to employ unsaturated dicarboxylic acids of preferably up to 8 carbon atoms, such as, far example, maleic acid, fumaric acid, itaconic acid or citraconic acid.

In place of the free dicarboxylic acids, there can be utilized the esters thereof with alkanols of 1–4, preferably 1–2 carbon atoms, e.g. dimethyl, diethyl, dipropyl or dibutyl esters. Insofar as the dicarboxylic acids form anhydrides, these can also be employed, e.g. phthalic acid anhydride, hexahydrophthalic acid anhydride, tetrahydrophthalic acid anhydride, succinic acid anhydride, glutaric acid anhydride or maleic acid anhydride.

Coatings having particularly satisfactory properties are obtained when using linear polyesters having average molecular weights of between 300 and 2,000, preferably between 500 and 1,500 when produced exclusively from ethylene glycol and hexahydroterephthalic acid and/or the derivatives thereof. On the other hand, when employing linear polyesters produced exclusively from propanediol-(1,2) and hexahydroterephthalic acid and/or the derivatives thereof, it is desirable for the molecular weights to be between 600 and 2,500, preferably between 1,000 2,000. In any case, the overall broad range for the molecular weight of the polyester, irrespective of the nature of adjacent diol, is generally about 300 to 2500, preferably about 500 to 2000.

The polyesters can be produced by any and all conventional processes, e.g. with or without a catalyst, with or without the passing of an inert gas stream over the reaction mixture, in the form of a solution condensation, melt condensation or azeotropic esterification, at temperatures of up to 250° C. or even higher. It is preferred that the liberated water or alkanols are continuously removed. The esterification reaction takes place almost quantitatively and can be monitored and controlled by the determination of the hydroxyl and acid numbers. The molecular weight can be expeditiously controlled by the initial charging ratio of diol to dicarboxylic acid.

Suitable N-methylol- and/or N-methylol-ether group-containing polymers and/or oligomers are, for example, the conventional reaction products of aldehydes, particularly formaldehyde, with several amino- or amido-group-carrying substances, such as, for example, with melamine, urea, N,N'-ethyleneurea, dicyanodiamide, and benzoguanamine. There can also be used polymers having the structure of copolymerizates into which is polymerized an amide of an α-ethylenically unsaturated carboxylic acid having N-methylol- and/or N-methylol-ether groups, for example, such polymers, which are obtained following the methods described in the U.S. Pat. 2,940,944, and the German patent applications 1,060,596, 1,083,548 and 1,089,549.

Especially advantageous are the aminoplasts which are modified with alcohols, preferably alkanols of 1–4 carbon atoms. In place of these resinous products, it is possible to employ with equally good success precursors of aminoplasts, e.g. hexamethylol melamine, dimethylol urea, optionally in the etherified form, for example, hexamethoxymethyl melamine, hexabutoxymethyl melamine, dimethoxymethyl urea, dibutoxymethyl urea, etc. Thus, a wide variety of commercially available aminoplasts can be used for combining with the special linear polyesters of the present invention. For more details regarding the aminoplasts which can be used, reference is made to "Organic Protective Coatings," Von Fischer and Bobaleck, 1953, Reinhold, pp. 210–225; "Lackunstharze" by H. Wagner and H. F. Sarx, Carl Hanser Verlag, München, 4th edition, 1959, pp. 60–74. Of course, it is also possible to use mixtures of all the above N-methylol products. In general then, any compound of the formula —NH—CH$_2$—O—R can be used wherein R represents hydrogen or alkyl of 1–4 carbon atoms, and the unsatisfied nitrogen valence is attached to an organic moiety capable of incorporation into a film and which does not interfere with the curing reaction.

The linear polyester generally has an acid number of 0,1 to 10, preferably 1 to 7 mg. KOH/g., and a hydroxyl number of 40 to 375, preferably 50 to 225 mg. KOH/g.

For producing the coatings, polyester and aminoplast are normally first dissolved in conventional varnish solvents, such as, for example, benzene, toluene, xylene, butanol, butyl acetate, ethyl glycol, ethyl glycol acetate, butyl glycol, methyl ethyl ketone, methyl isobutyl ketone, cyclohexanone or mixtures thereof. In this connection, the weight ratio of polyester:aminoplast can vary between 60:40 and 90:10 and the total amount of binder in the varnishes can vary within the usual limits, depending on the ultimate use of the varnish. The optimum ratios can readily be determined by a few routine tests; as a rule the total amount of binder in the varnishes will be between about 15 and 60 percent by weight.

The varnishes can contain the conventional additives and auxiliary substances, e.g. pigments, viscosity and flow modifiers, and other binders, such as epoxide resins, for example.

The thus-obtained varnish is then applied and baked at temperatures between 100 and 200° C. The cross-linking reactions taking place during this process are catalytically accelerated by acids. When employing polyesters having a very low acid number, it is thus possible to add acidic substances to the varnish. When adding, for example, 0.5% p-toluenesulfonic acid (based on the total amount of binder), the cross-linking reaction is highly accelerated. By adding even larger amounts of acid, it is also possible to produce coatings which dry at room temperature.

Also, by reacting a polyester having a low acid content with about 1–5% of an anhydride of a relatively strongly acidic dicarboxylic acid, e.g. maleic acid anhydride, the acid number of the polyester can be subsequently increased and, in this manner, the baking temperatures can be lowered also without the addition of strongly acidic substances.

The coatings prepared in accordance with the invention exhibit a variety of excellent properties. They have a high gloss, can be very readily pigmented, and show excellent resistance against yellowing. If the coatings are subjected to curing for 72 hours at 100° C., no visible yellowing can be observed. Even when cured at 150° C. for 72 hours, the coatings are still substantially, if not completely, resistant to yellowing. The coatings are also resistant to solvents, such as xylene, gasoline-benzene mixtures, esters and ketones, as well as being highly resistant to acids and alkalis. For example, in salt spraying tests, tropical tests and tests in the weatherometer, they prove to be superior corrosion-resistant and weather-resistant materials.

Moreover, the most noteworthy property of the coatings produced in accordance with this invention is their high elasticity combined with great hardness, which elasticity is preserved even when overbaked.

The elastic behavior of coatings is normally defined by conducting the Erichsen depression test (in accordance with DIN [German Industrial Standard] 53,156) and stating, as a measure for the elasticity the depression of the coated sheet metal in mm. at which the varnish coating begins to crack. It is essential for this test procedure for deformation of the coating to be gradual (advance: 0.2 mm./sec.).

A definition for the behavior of coatings subjected to a sudden deformation is supplied by the so-called impact depression measurement. This measurement can be conducted, for example, with the impact depression apparatus 226/D of Erichsen, Hemer-Sundwig. In this apparatus, a hemisphere having a radius of 10 mm. is suddenly impressed into the sheet of metal (unvarnished side facing upward) by a falling weight of 8 kg. By varying the falling height of the weight, the depression can be varied. The depression value is stated (in mm.) at which the varnish coating begins to rupture. (The values indicated in the examples were obtained in this manner. In several examples, the value of >5 is stated, since the apparatus described above does not make it possible to obtain a greater depression when using the deep-drawn metal sheets of 1 mm. in thickness employed for the test.)

As has been set forth in connection with the description of the state of the art, and as has been proven by comparative tests, coatings of linear polyesters and aminoplasts have been known which are elastic and also withstand impact stresses. However, these coatings exhibit very low hardness values (in accordance with DIN 53,157). On the other hand, coatings of great hardness are known which, however, are not elastic. In contrast thereto, the coatings obtained in accordance with the present invention exhibit high elasticity as well as high hardness.

This spectrum of properties opens up a wide field of applications for the coatings. In addition to being employed for varnishing individual parts subjected to high impact stress, the coatings are particularly well suited to the varnishing of materials which are subsequently deformed, e.g. by punching. The polyesters of this invention normally result in solutions of a comparatively low viscosity, e.g. 100 to 500 centipoises at room temperature. Therefore, varnishes having high solids contents can be utilized, thereby reducing labor costs, etc., for applying same.

Therefore, the coating compositions of this invention may be used for varnishing or enameling of e.g. automobile bodies, refrigerators, washing machines; etc.; also they are suited for coil-coating. The coatings produced in accordance with this invention may be applied by different modes, e.g. spraying, dipping, brushing and wiping.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Unless otherwise indicated, all percentages and ratios are on a weight basis.

PRODUCTION OF THE POLYESTER

Method A 344 g. of hexahydroterephthalic acid (2 mols) and 186 g. of ethylene glycol (3 mols) are heated for 1 hour to 180° C. After adding 15 ml. of xylene, the esterification components are maintained at this temperature for another 14 hours, with the water being removed continuously. Thereafter, the entraining agent is distilled off with the aid of a vigorous stream of nitrogen. The thus-obtained polyester has an acid number of 4.2 mg. KOH/g., a hydroxyl number of 198.2 mg. KOH/g. and an average molecular weight of 550.

Method B 1,000 g. of hexahydroterephthalic acid dimethyl ester (5 mols), 456 g. of propanediol-(1,2) (6 mols) and 2.91 ml. of a 30% solution of titanium tetraisopropylate in isopropanol are first heated for 2 hours to 160° C., with the thus-produced methanol being distilled off continuously; then, the reaction mixture is slowly heated to 190° C. and maintained at this temperature for 5 hours. Later, the reaction mixture is additionally heated for 5 hours to 200° C. and for 5 hours to 220° C. After the theoretical hydroxyl number has been reached, a water aspirator is used for 15 minutes in order to remove readily volatile components. The thus-produced polyester exhibits an acid number of 0.4 mg. KOH/g., a hydroxyl number of 94.6 mg. KOH/g. and an average molecular weight of 1,180.

INCREASING THE ACID NUMBER OF A POLYESTER

To a 60% xylene solution of a polyester having a low acid number is added 1.5% of maleic acid anhydride (based on the pure polyester). After the added anhydride is completely dissolved, the reaction mixture is heated for 1 hour to 120° C. whereby the acid number of the polyester is increased by 8.56 mg. KOH/g.

PRODUCTION OF A VARNISH

The solution of the thus-obtained polyesters in xylene are mixed with a commercially available 55% solution of a melamine-formaldehyde condensate in a xylene-butanol mixture (1:1) in the desired solids ratio. In order to prepare a polyester:melamine resin proportion of 7:3, 117 g. of a 60% solution of the polyesters in xylene is mixed with 54.5 g. of the above-mentioned melamine resin solution.

PRODUCTION OF AN ENAMEL

In order to produce an enamel, a clear varnish is pigmented with $TiO_2$ in a weight ratio of binder:pigment of 2:1.

PRODUCTION AND TESTING OF THE COATINGS

For testing purposes, the clear varnish or the enamel is applied to both metal sheets and glass plates and then baked. In order to reduce the baking temperature, 0.5% of p-toluenesulfonic acid (based on the total binder) is added to varnish solutions produced with the use of polyesters of a low acid number. The layer thickness of the tested films is, in all examples, 40–60μ. The hardness test is conducted in accordance with DIN 53,157, and the elasticity test in accordance with the methods described in the foregoing.

Examples 1–15 are compiled in the table. In addition, the table lists the test values for the coatings produced from the polyesters dealt with in the following comparative examples.

COMPARATIVE EXAMPLE 1

1,580 g. of the symmetrical bis(hydroxyethyl) ether of bisphenol A (5 mols) is heated with 400 g. of succinic acid anhydride (4 mols) for 6 hours to 180° C., with a nitrogen stream being passed through the reaction mixture. Residual amounts of water of reaction are then removed by applying a vacuum of about 20 torr [mm. Hg]. The thus-produced polyester exhibits an acid number of 5 mg. KOH/g.; it is dissolved in a xylene-methyl ethyl ketone-cyclohexanone mixture (1:1:1) to form a 50% solution.

COMPARATIVE EXAMPLE 2

(Example 2 from U.S. Pat. 2,460,186)

148 g. of phthalic acid anhydride, 146 g. of adipic acid, 278 g. of 2-ethyl-hexanediol-1,3 and 110 ml. of xylene are heated during 4 hours to 180° C. and, in another 4 hours, to 200° C. the water formed during the reaction being removed by way of a water trap. Thereafter, the solvent is slowly distilled off within 4.5 hours, so that a temperature of 240° C. is finally reached.

COMPARATIVE EXAMPLE 3

(Example 4 from U.S. Pat. 2,460,186)

148 g. of phthalic acid anhydride, 202 g. of sebacic acid, 278 g. of 2-ethyl-hexanediol-1,3, 28 g. of glycerin and 110 ml. of xylene are slowly heated to 230° C. within 11.5 hours, and the thus-produced water is removed by way of a water trap. Towards the end of the esterification process, the solvent is slowly distilled off, and the reaction mixture is maintained at 230° C. for 3 hours.

COMPARATIVE EXAMPLE 4

(Example 1 from "Ullmanns Encycklopadie der technischen Chemie" [Ullmann's Encyclopedia of Technical Chemistry], Third edition, vol. 14, p. 87, Urban and Schwarzenberg Publishers, Munich-Berlin, 1963.)

1,400 g. of adipic acid (9.6 mols) and 675 g. of ethylene glycol (10.9 mols) are gradually heated to 130° C.–140° C. under a continuous nitrogen stream. To prevent glycol from being entrained when the water of reaction is distilled off, part of the distillate is refluxed. During the course of several hours, the reaction mixture is heated to 200° C., then cooled to 150° C., and the condensation (i.e., esterification) is continued under vacuum, until the condensation process is terminated after 5–8 hours at 200 torr and 200° C. The resultant waxy polyester has a hydroxyl number of 54 mg. KOH/g. and an average molecular weight of 2,000; this polyester is dissolved in a xylene-methyl ethyl ketone mixture (1:1) to form a 50% solution.

COMPARATIVE EXAMPLE 5

(Example 2 from "Ullmanns Encyklopadie der technischen Chemie," Third edition, vol. 14, p. 87, Urban and Schwarzenberg Publishers, Munich-Berlin, 1963.)

316 g. of adipic acid (2.16 mols), 480 g. of phthalic acid anhydride (3.24 mols) and 374 g. of ethylene glycol (6.5 mols) are gradually heated to 160–200° C. under continuous nitrogen stream, until 118 g. of the distillate have passed over. In this connection, care must be taken that the overhead temperature at the top of the column does not exceed 100° C. Subsequently, an additional 19 g. is distilled off within 6 hours, under an increasing vacuum. The polyester exhibits an acid number of 3–4 mg. KOH/g. and a hydroxyl number of 56 mg. KOH/g.; it is dissolved in a xylene-methyl ethyl ketone-cyclohexanone mixture (1:1:1) to form a 50% solution.

| Example No. | Polyester from, mol | Method of preparation | Average molecular weight | Weight ratio of polyester: melamine resin :TiO² | Catalyst | Baking conditions | Pendulum hardness, sec. | Deep drawability, mm. | Impact depression, mm. |
|---|---|---|---|---|---|---|---|---|---|
| 1 | 2 EG+ | B | 325 | 7:3:0 | | 190°/30′ | 191 | 6.9 | 3 |
| | 1 DMHT+ | B | | | 0.5% pTA+ | 130°/30 | 198 | 6.2 | 3 |
| 2 | 3 EG | A | 550 | 7:3:0 | | 190°/30′ | 183 | 8.6 | 5 |
| | 2 HTA+ | A | | | 0.5% pTA | 130°/30′ | 191 | 8.4 | 5 |
| 3 | 5 EG | B | 850 | 7:3:0 | | 190°/30′ | 167 | 9.5 | >5 |
| | 4 DMHT | B | | | 0.5% pTA | 130°/30′ | 172 | 9.3 | >5 |
| | | B | | 7:3:5 | 0.5P pTA | 130°/30′ | 154 | 9.1 | >5 |
| 4 | 7 EG | B | 1,400 | 7:3:0 | | 190°/30′ | 160 | 9.6 | >5 |
| | 6 DMHT | B | | | 0.5% pTA | 130°/30′ | 163 | 9.4 | >5 |
| 5 | 9 EG | A | 1,720 | 7:3:0 | 0.5% pTA | 130°/30′ | 110 | 9.2 | >5 |
| | 8 HTA | A | | | | | | | |
| 6 | 11 EG | A | 2,100 | 7:3:0 | 0.5% pTA | 130°/30′ | 83 | 9.5 | >5 |
| | 10 HTA | A | | | | | | | |
| 7 | 4 PG+ | B | 720 | 7:3:0 | | 190°/30′ | 202 | 8.0 | 2 |
| | 3 DMHT | B | | | 0.5% pTA | 130°/30′ | 217 | 7.4 | 2 |
| | | B | | | MA+ | 130°/30′ | 198 | 7.9 | 2 |
| | | B | | 7:3:5 | 0.5% pTA | 130°/30′ | 172 | 7.5 | <2 |
| 8 | 5 PG | B | 910 | 7:3:0 | 0.5 pTA | 130°/30′ | 199 | 7.9 | 2 |
| | 4 DMHT | B | | | MA | 130°/30′ | 172 | 8.6 | <2 |
| 9 | 6 PG | B | 1,180 | 7:3:0 | 0.5% pTA | 130°/30′ | 199 | 9.1 | 5 |
| | 5 DMHT | B | | | MA | 130°/30′ | 171 | 8.5 | 4 |
| | | B | | 7:3:5 | 0.5% pTA | 130°/30′ | 182 | 7.6 | 3 |
| | | B | | | MA | 130°/30′ | 162 | 7.3 | 2-3 |
| 10 | 9 PG | B | 1,900 | 7:3:0 | 0.5% pTA | 130°/30′ | 176 | 8.4 | 5 |
| | 8 DMHT | B | | | MA | 130°/30′ | 168 | 8.8 | 4 |
| | | B | | 7:3:5 | 0.5% pTA | 130°/30′ | 161 | 8.3 | 3 |
| | | B | | 8:2:0 | 0.5% pTA | 130°/30′ | 163 | 10.0 | 4 |
| 11 | 11 PG | B | 2,300 | 7:3:0 | 0.5% pTA | 130°/30′ | 170 | 8.4 | 2 |
| | 10 DMHT | B | | 7:3:5 | 0.5% pTA | 130°/30′ | 130 | 8.3 | <2 |
| | | B | | 8:2:0 | 0.5% pTA | 130°/30′ | 147 | 9.8 | <2 |
| 12 | 8 PG + 1 DG+ 8 DMHT | B | 1,850 | 7:3:0 | 0.5% pTA | 130°/30′ | 132 | 8.6 | >5 |

TABLE—Continued

| Example No. | Polyester from, mol | Method of preparation | Average molecular weight | Weight ratio of polyester: melamine resin :TiO² | Catalyst | Baking conditions | Pendulum hardness, sec. | Deep drawability, mm. | Impact depression, mm. |
|---|---|---|---|---|---|---|---|---|---|
| 13 | 9 PG<br>7 DMHT<br>1 PA+ | B | 1,870 | 7:3:0 | 0.5% pTA | 130°/30' | 191 | 8.7 | 2–3 |
| 14 | 9 PG<br>7 DMHT<br>1 AdA+ | B | 1,900 | 7:3:0 | 0.5% pTA | 130°/30' | 126 | 9.2 | >5 |
| 15 | 8 PG<br>1 DG<br>7 DMHT<br>1 PA | B | 1,850 | 7:3:0 | 0.5% pTA | 130°,30' | 165 | 9.0 | 2–3 |

| | Weight ratio of polyester: melamine resin :TiO² | Catalyst | Baking conditions | Pendulum hardness, sec. | Deep drawability, mm. | Impact depression, mm. |
|---|---|---|---|---|---|---|
| Comparative Example 1 | 7:3:0 | 0.5% pTA | 130°/30' | 135 | 1.1 | <1 |
| Comparative Example 2 | 7:3:0 | 0.5% pTA | 130°/30' | 33 | 2.0 | <1 |
| Comparative Example 3 | 7:3:0 | 0.5% pTA | 130°/30' | 24 | 8.3 | >5 |
| Comparative Example 4 | 7:3:6 | 0.5% pTA | 130°/30' | 50 | 5.6 | 5 |
| Comparative Example 5 | 7:3:5 | 0.5% pTA | 130°/30' | 25 | 7.9 | >5 |

NOTE:
EG = Ethylene Glycol.
PG = Propanediol-(1,2).
DMHT = Dimethyl Ester of Hexahydroterephthalic Acid.
HTA = Hexahydroterephthalic Acid.
pTA = p-Toluenesulfonic Acid.
MA = Maleic Acid anhydride (The polyester of low acid content is brought to a higher acid number in accordance with the aforedescribed method by reaction with 1.5% of maleic acid anhydride, based on the pure polyester.).
DG = Diethylene Glycol.
PA = Phthalic Acid anhydride.
AdA = Adipic Acid.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An uncured coating composition comprising:
(A) 40–10% by weight of a material selected from the group consisting of a polymer and oligomer of a compound of the formula —NH—CH$_2$—OR wherein R represents hydrogen or alkyl of 1–4 carbon atoms and the unsatisfied valence is an organic moiety capable of forming a film and not interfering with curing;
(B) 60–90% by weight of linear polyester having an average molecular weight of between 300 and 2,500, of:
  (I) an alcohol reactant comprising:
    (1) 80–100 molar percent of a diol having adjacent hydroxyl groups, and
    (2) 0–20 molar percent of at least one member selected from the group consisting of aliphatic and cycloaliphatic diols wherein the hydroxyl functions are separated by 3–8 carbon atoms, and wherein optionally up to 2 of the chain carbon atoms can be replaced by ether oxygen atoms, said oxygen atoms must be separated by at least 2 carbon atoms; and
  (II) an acid reactant comprising:
    (1) 80–100 molar percent of hexahydroterephthalic acid, and
    (2) 0–20 molar percent of a different dicarboxylic acid.

2. A coating composition as defined by claim 1 wherein said polyester consists of ethylene glycol and hexahydroterephthalic acid and has an average molecular weight of 500–1500.

3. A coating composition as defined by claim 1 wherein said polyester consists of propanediol-(1,2) and hexahydroterephthalic acid and has an average molecular weight of 1000–2500.

4. A coating composition according to claim 1 wherein said material (A) is selected from the group consisting of a melamine-formaldehyde condensate, a urea-formaldehyde condensate, and N,N'-ethyleneurea-formaldehyde condensate, a dicyanodiamide-formaldehyde condensate, and a benzoguanamine-formaldehyde condensate.

5. A coating composition according to claim 2 wherein said material (A) is selected from the group consisting of a melamine-formaldehyde condensate, a urea-formaldehyde condensate, and N,N'-ethyleneurea-formaldehyde condensate, a dicyanodiamide-formaldehyde condensate, and a benzoguanamine-formaldehyde condensate.

6. A coating composition according to claim 3 wherein said material (A) is selected from the group consisting of a melamine-formaldehyde condensate, a urea-formaldehyde condensate, and N,N-ethyleneurea-formaldehyde condensate, a dicyanodiamide-formaldehyde condensate, and a benzoguanamine-formaldehyde condensate.

7. A coating composition as defined by claim 1 further comprising an organic solvent in which said composition is dissolved.

8. A coating composition as defined by claim 4 further comprising an organic solvent in which said composition is dissolved.

9. A coating composition as defined by claim 5 further comprising an organic solvent in which said composition is dissolved.

10. A coating composition as defined by claim 6 further comprising an organic solvent in which said composition is dissolved.

11. A cured coating produced from the coating composition of claim 1.

12. An article of manufacture comprising a substrate having superimposed hereon a substantially uniform layer of a cured coating according to claim 11.

13. An article as defined by claim 12 wherein said substrate is metal.

References Cited

UNITED STATES PATENTS

| | | | |
|---|---|---|---|
| 2,901,466 | 8/1959 | Kibler et al. | 260—75 |
| 2,961,427 | 11/1960 | Walter | 260—850 |
| 3,049,506 | 8/1962 | Kibler et al. | 260—75 |
| 3,385,831 | 5/1968 | Watson | 260—75 |
| 3,390,132 | 6/1968 | Walker | 260—75 |

FOREIGN PATENTS

| | | | |
|---|---|---|---|
| 741,091 | 11/1943 | Germany | 260—850 |

JOHN C. BLEUTGE, Primary Examiner

U.S. Cl. X.R.

117—132, 161; 260—31.6, 32.8, 33.4, 33.6, 39, 40, 75, 475, 485, 834 835